Figure 1:
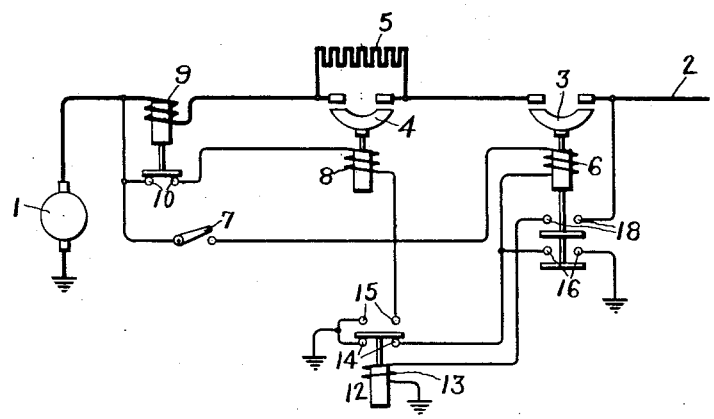

Inventor:
Gordon R. McDonald;
by Alexander S. Lunt,
His Attorney.

Patented Apr. 21, 1925.

1,534,724

UNITED STATES PATENT OFFICE.

GORDON R. McDONALD, OF SCHENECTADY, NEW YORK, ASSIGNOR TO GENERAL ELECTRIC COMPANY, A CORPORATION OF NEW YORK.

AUTOMATIC SWITCHING SYSTEM.

Application filed April 8, 1924. Serial No. 705,108.

*To all whom it may concern:*

Be it known that I, GORDON R. McDonald, a subject of the British Empire, residing at Schenectady, in the county of Schenectady, State of New York, have invented certain new and useful Improvements in Automatic Switching Systems, of which the following is a specification.

My invention relates to automatic switching systems for controlling the connection between a source of current and a load circuit.

It is the practice in some automatic switching systems which are arranged to control the connection between a source and a load circuit, to provide at least two switches between the source and the load circuit. One of the switches is arranged to be closed first so as to connect the source to the load circuit with a resistor or other current limiting means in series therewith in order to limit the current supplied by the source in case there is a short circuit or overload connected to the load circuit. The other switch is arranged to be closed, after the first switch is closed, to short circuit the resistor. The second or short-circuiting switch is controlled by the first switch so that it cannot be closed until after the first switch has been closed. The short-circuiting switch is also controlled by an overload relay which is connected so as to be responsive to the current flowing from the source to the load circuit. The overload relay is arranged so that when the load exceeds a predetermined value, after the short-circuiting switch is closed, the overload relay operates and effects the opening of the short-circuiting switch to insert the current limiting resistor in series with the source, and when the load decreases below a predetermined value after the short circuiting switch opens in response to an overload, the overload relay operates and effects the closing of the short-circuiting switch.

In order to prevent the decreased current, which is produced by the resistor being inserted in series with the source, from causing the overload relay to effect the reclosing of the short-circuiting switch, as soon as it opens, the overload relay is designed so that it does not operate to effect the reclosing of the short-circuiting switch until the current decreases to a very much smaller value than the value which causes it to effect the opening of the switch.

It has been found in practice that if there is an overload connected to the load circuit when the first switch is closed, the overload relay does not always operate, after the first switch closes, to prevent the short-circuiting switch from closing because the current limiting means limits the overload current to a value below the pick-up value of the relay. Therefore as soon as the first switch is closed, the closing circuit of the short-circuiting switch is closed and the source is connected directly across the overload or short circuit. Obviously it is very desirable that the short-circuiting switch should not close under such conditions and one object of my invention is to provide an arrangement for accomplishing this result.

In accordance with my invention I provide a relay, which is arranged so as to operate in accordance with the current supplied by the source after the first switch closes, and which controls the closing coil circuit of the short-circuiting switch so that after the first switch is closed to connect the source to the load circuit with the current limiting means in series therewith, the short-circuiting switch cannot be closed until the load is such that the current supplied by the source when the short-circuiting switch is closed is less than the pick-up value of the overload relay.

My invention will be better understood from the following description taken in connection with the accompanying drawings and its scope will be pointed out in the appended claims.

Figure 2:
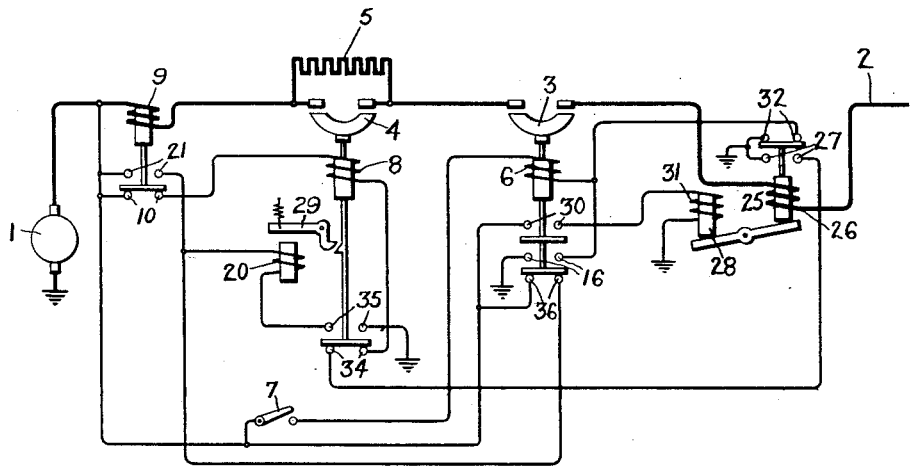
Figure 3:
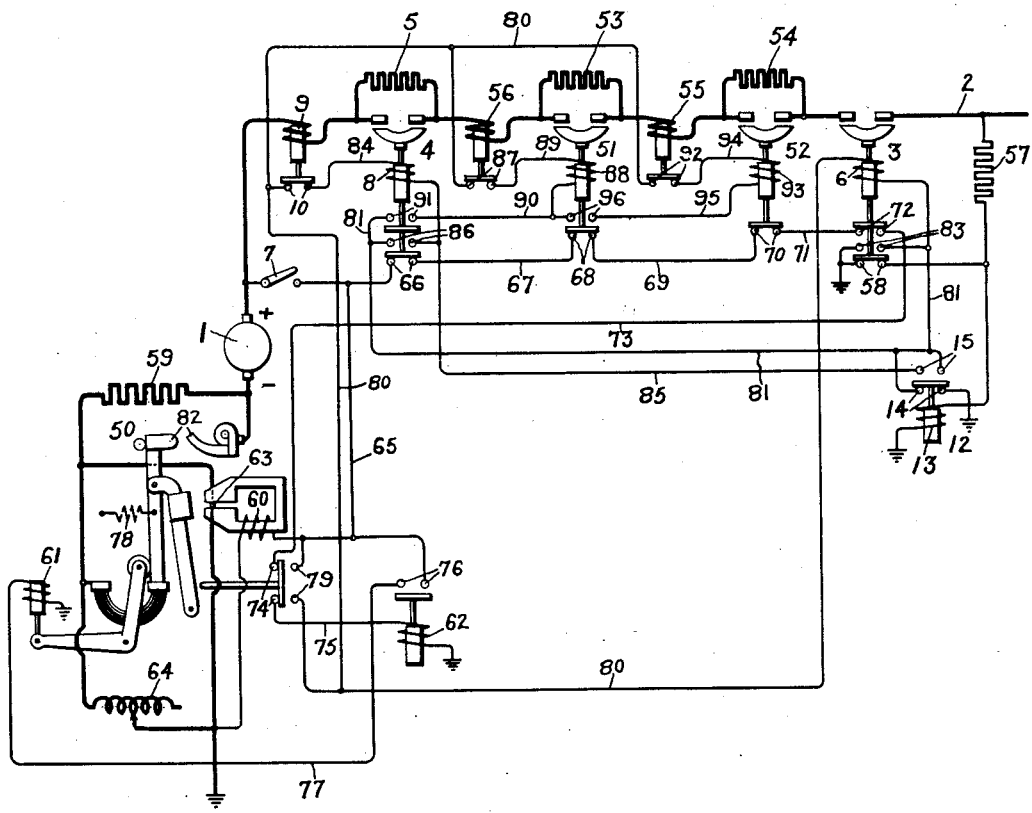

Referring to the drawing Fig. 1 shows a circuit breaker control system embodying my invention, Fig. 2 shows a modification of the arrangement shown in Fig. 1, and Fig. 3 another modification of my invention.

Referring to Fig. 1, 1 represents a generator which is arranged to be connected directly to a load circuit 2 by means of two circuit breakers 3 and 4. In order to simplify the disclosure, the ground is shown as the return conductor of the load circuit and the two circuit breakers 3 and 4 are shown between the ungrounded terminal of the generator and the ungrounded side of the circuit. It is evident, however, that a metallic conductor may be used as a return conductor and that either circuit breaker may control the connection between either terminal of the generator and the corresponding side of the load circuit.

When only the circuit breaker 3 is closed, the generator 1 is connected to the circuit 2 with the current limiting means 5, shown as a resistor, in series therewith. The purpose of having the resistor connected in series with the generator 1, when it is connected to the load circuit, is to limit the current supplied by the generator in case there is a short circuit or overload connected to the load circuit when the generator is connected thereto.

The circuit breaker 3 may be of any suitable type and may be operated either manually or automatically. As shown the circuit breaker 3 is provided with a closing coil 6 the circuit of which is arranged to be completed across the generator 1 by means of a suitable switch 7, such as a hand switch. It is obvious, however, that the switch 7 may be arranged to be operated automatically in any well-known manner.

The circuit breaker 4, when closed, short circuits the resistor 5. This circuit breaker 4 is provided with a closing coil 8, the circuit of which is arranged to be completed across the generator 1 when it is desired to close the circuit breaker. In order that the resistor 5 may be connected in series with the generator to limit the current supplied thereby when the load connected to the circuit 2 exceeds a predetermined value, the circuit of the closing coil 8 is controlled by an overload relay 9 the coil of which is connected in series with the generator 1 and load circuit 2. This relay is designed so that it picks up and opens its contacts 10, which are in the circuit of the closing coil 8, when the current supplied by the generator exceeds a predetermined value and drops down and closes its contacts 10 when the current decreases below a lower predetermined value. The reason for having different pick-up and drop-out values is to prevent the overload relay 9 dropping down and closing its contacts 10 when the resistor 5 is inserted in series with the generator and there is an overload connected to the load circuit.

Due to the difference between the pick-up and drop-out values of the overload relay 9, it will be observed that when the circuit breaker 3 is closed to connect the generator 1 to the load circuit 2 the overload relay 9 does not open its contacts 10, unless there is a very severe overload connected to the load circuit, because the load limiting resistor, which is connected in series therewith, limits the current supplied to the overload. Therefore the overload relay 9 does not prevent the circuit breaker 4 from closing and connecting the generator 1 directly across the overload under these conditions. It is obvious, however, that it is very undesirable to have the circuit breaker 4 close and connect the generator 1 directly across an overload or short circuit.

In accordance with my invention I provide an arrangement for preventing the circuit breaker 4 from being closed, after the circuit breaker 3 closes, until the load connected to the load circuit has decreased to such a value that the current applied thereto, when the circuit breaker 4 closes, is below the pick-up value of the overload relay 9. One means for accomplishing this result is shown in Fig. 1. This means comprises a voltage relay 12 which is arranged to be connected across the load circuit 2 when the circuit breaker 3 is closed and which is arranged to effect the closing of contacts in the circuit of the closing coil 8 of the circuit breaker 4 when the voltage across the load circuit exceeds a predetermined value.

It will be evident that, since the current limiting resistor 5 is connected in series with the load circuit 2, the voltage across the load circuit varies in accordance with the load connected thereto and therefore is an indication of the current being supplied by the generator. By having the voltage relay 12 adjusted to the proper value, it is evident that the circuit breaker 4 can be maintained in its open position until the load decreases to such a value that the current supplied thereto, after the circuit breaker 4 closes, is less than the pick-up value of the overload relay 9.

In order to prevent the circuit breaker 3 from being closed except when the circuit breaker 4 is open, the voltage relay also controls contacts in the circuit of the closing coil 6 of the circuit breaker 3 so that the circuit of the closing coil 6 can be closed only when the circuit of the closing coil is open. As shown in the drawing coil 13 of the relay 12 is arranged to be connected across the load circuit 2 by the auxiliary contacts 18 on the circuit breaker 3 when the circuit breaker is closed. The relay 12 is provided with the contacts 14 which are closed when the relay is in its deenergized position and which are in the circuit of the closing coil 6 of the circuit breaker 3. The relay 12 is also provided with the contacts 15, which are closed when the voltage across the load circuit 2 exceeds a predetermined value and which are in the circuit of the closing coil 8 of the circuit breaker 4. Since the relay 12 is operative to close its contacts 15 only when the circuit breaker 3 is closed, it is evident that the circuit breaker 4 cannot be closed until after the circuit breaker 3 is closed.

In order to prevent the circuit of the coil 6 of the circuit breaker 3 from being opened when the voltage relay 12 opens its contacts 14 after the closing of the circuit breaker 3, the circuit breaker is provided with the auxiliary contacts 16 which complete a locking circuit for the closing coil 6 when the circuit breaker closes.

The operation of the system shown in Fig. 1 is as follows: When the generator 1 is disconnected from the load circuit the apparatus is in the position shown. When it is desired to connect the generator 1 to the load circuit 2 the switch 7 is closed so that the circuit of the closing coil 6 of the circuit breaker 3 is completed to close the circuit breaker. This circuit is from the ungrounded terminal of the generator 1, through the switch 7, closing coil 6 of the circuit breaker 3, contacts 14 of the voltage relay 12 to the grounded terminal of the generator 1. The closing of the circuit breaker 3 connects the generator 1 to the load circuit 2 with the resistor 5 in series therewith. In its closed position, the circuit breaker 3, by means of its auxiliary contacts 16, completes a locking circuit for its coil 6 and, by means of its auxiliary contacts 18, connects the coil 13 of the voltage relay 12 across the load circuit 2. If there is an overload or a short circuit connected to the load circuit when the circuit breaker 3 closes, the resistor 5 limits the current supplied thereto so that the overload relay does not open its contacts 10, and the voltage across the load circuit is so low that the relay 12 cannot operate to close its contacts 15. Therefore the circuit breaker 4 remains open since the circuit of its closing coil 8 is open at the contacts 15 of the relay 12. As the resistance of the overload or short circuit increases the voltage across the load circuit 2 increases until the voltage reaches a predetermined value when the relay 12 operates and closes its contacts 15 thereby completing the circuit of the closing coil 8 of the circuit breaker 4 to close this circuit breaker. This circuit is from the ungrounded terminal of the generator 1, through the contacts 10 of the overload relay 9, closing coil 8 of the circuit breaker 4, contacts 15 of the relay 12 to the grounded terminal of the generator. The closing of the circuit breaker 4 short circuits the resistor 5 so that the generator 1 is connected directly to the load circuit 2.

When an overload or short circuit occurs after the closing of the circuit breaker 4, the overload relay 9 operates and opens its contacts 10 so as to deenergize the closing coil 8, and thereby effect the opening of the circuit breaker 4. As soon as the overload or short-circuit disappears after the circuit breaker 4 opens, the overload relay drops down and completes the circuit of the closing coil 8 to close the circuit breaker 4.

In Fig. 2 I have shown a modification of the arrangement shown in Fig. 1. The circuit breaker 4 is shown as a latched-in breaker having a closing coil 8 and a trip coil 20. The circuit of the trip coil 20 is arranged to be completed by the contacts 21 of the overload relay 9 when the current through the coil of the overload relay exceeds a predetermined value.

For preventing the circuit breaker 4 from closing, if the load exceeds a predetermined value when the circuit breaker 3 closes, I have shown, in this modification of my invention, a current relay 25 which controls the circuit of the closing coil 8 of the circuit breaker 4. This current relay 25 is operative in response to the current supplied to the load circuit through current limiting resistor 5 so that when this current decreases below a predetermined value, the relay effects the closing of the circuit breaker 4. As shown, the coil 26 of the relay 25 is connected in series with the load circuit 2. The relay 25 effects the closing of the circuit breaker 4, when it is open, by closing the contacts 27 in the circuit of the closing coil 8 of the circuit breaker 4.

In order to prevent the contacts 27 of the current relay 25 from being closed to complete the circuit of the closing coil 8 of the circuit breaker 4 until after the circuit breaker 3 closes, I provide another relay 28 which is mechanically connected to the relay 25 so that when both relays are not energized the weight of the movable core of the relay 28 is sufficient to cause the core of the relay 25 to be moved to the position it occupies when the contacts 27 are open. The relay 25 is controlled by the circuit breaker so that when the circuit breaker is open the relay 25 is deenergized. In order to render the relay 25 operative to close the contacts 27 in accordance with the current supplied to the distribution circuit 2 by the generator 1 after circuit breaker 3 closes, the circuit breaker 3 is arranged to complete the circuit of the coil 31 of the relay 28 so that the core of the relay 28 is raised and core of the relay 25 is free to drop except for the force excited by the coil 26. Preferably the relay 28 is designed in any well known manner so that its core is not raised to free the core of the relay 25 until after the circuit of the winding 31 has been completed for a certain length of time. This is to allow sufficient time for the current through the coil 26 to build up to a steady value.

The relay 25 is also provided with the contacts 32, which are closed when the contacts 27 are open, and which are in the circuit of the closing coil 6 so that the circuit breaker 3 can be closed only when the circuit of the closing coil 8 of the circuit breaker 4 is open.

The operation in the modification shown in Fig. 2 is as follows: When the generator 1 is disconnected from the load circuit the apparatus is in the position shown.

When it is desired to connect the generator 1 to the load circuit 2 the switch 7 is closed so that the circuit of the closing coil 6 of the circuit breaker 3 is completed to close the circuit breaker. This circuit is from the ungrounded terminal of the generator 1, through the contacts of the switch 7, closing coil 6 of the circuit breaker 3, contacts 32 of the relay 25 to the grounded terminal of the generator. The circuit breaker 3, in its closed position, completes a locking circuit for its closing coil 6 by means of its auxiliary contacts 16 which are in parallel to the contacts 32 of the relay 25. The closing of the auxiliary contacts 30 on the circuit breaker 3 completes a circuit for the coil 31 of the relay 28 from the ungrounded terminal of the generator 1, through the auxiliary contacts 30 on the circuit breaker 3, coil 31 of relay 28 to the grounded terminal of the generator. After a predetermined time, the core of the relay 28 moves up so that the core of the relay 25 is free to move down and close the contacts 27 as soon as the current supplied by the generator 1 through the resistor 5 is less than a predetermined value. As soon as there is less than a predetermined load connected to the load circuit, the relay 25 closes its contacts 27, thereby completing a circuit for the closing coil 8 of the circuit breaker 4 to close this circuit breaker. This circuit is from the ungrounded terminal of the generator 1, through the contacts 10 of the overload relay 9, closing coil 8 of the circuit breaker 4, auxiliary contacts 34 on the circuit breaker 4, contacts 27 of the relay 25 to the grounded terminal of the generator 1. When the circuit breaker 4 closes, the circuit of the closing coil 8 is opened by the opening of the auxiliary contacts 34, but the circuit breaker is held in its closed position by the latch 29. The closing of the circuit breaker 4 connects the generator 1 directly to the load circuit 2.

When an overload occurs after the circuit breaker 4 is closed, the overload relay 9 operates and closes its contacts 21 thereby completing the circuit of the trip coil 20 to trip the latch 29 and open the circuit breaker 4. This circuit is from the ungrounded terminal of the generator 1, through the contacts 21 of the overload relay 9, trip coil 20, auxiliary contacts 35 on the circuit breaker 4 to ground. The opening of the circuit breaker 4 removed the short circuit from around the resistor 5 so that this resistor is connected in series with the generator 1 to limit the current supplied to the load circuit 2.

The relay 25 is so designed that it can close its contacts 32 only when the coil 31 of the relay 28 is deenergized. Therefore, it does not operate upon the occurrence of an overload to open its contacts 27. As soon as the overload decreases below a predetermined value, the overload relay 9 drops down and closes its contacts 10, thereby completing the heretofore described circuit of the closing coil 8 to close the circuit breaker 4.

When it is desired to disconnect the generator 1 from the load circuit 2, the switch 7 is opened, thereby opening the circuit of the closing coil 6 of the circuit breaker 3. The opening of the auxiliary contacts 30 on the circuit breaker 3 deenergizes the relay 28 so that the contacts 27 of the relay 25 are opened, and the contacts 32 are closed. The closing of the auxiliary contacts 36 on the circuit breaker 3, when it opens, completes a circuit for the trip coil 20 of the circuit breaker 4, if this circuit breaker is closed, so that it opens. This circuit is from the ungrounded terminal of the generator 1 through auxiliary contacts 36 on the circuit breaker 3, trip coil 20, auxiliary contact 35 on the circuit breaker 4 to the grounded terminal of the generator 1.

It will be observed that I have shown in Figs. 1 and 2 two different arrangements whereby the circuit breaker 4 is prevented from closing, when the circuit breaker 3 is closed, and the overload relay contacts 10 are closed, until the load connected to the load circuit is less than the value which will cause the overload relay 9 to operate and open the circuit breaker 4 when said circuit breaker 4 is closed.

In Fig. 3 I have shown a modification of the arrangement shown in Fig. 1 in connection with a complete automatic load limiting system. In addition to the circuit breakers 3 and 4, three other circuit breakers 50, 51, and 52 are connected between the generator 1 and the load circuit 2, each of these circuit breakers being arranged to insert, when it opens, a resistor or other current limiting means in series with the generator. The circuit breaker 50 is preferably of the well known high speed type which is arranged to open in response to one value of load current when the current increases gradually, and in response to a much lower value of load current when the current increases rapidly as when a short circuit occurs. The particular type of high speed circuit breaker shown is disclosed and claimed in a copending application, Serial No. 511,000, filed October 28, 1921, by J. F. Tritle and assigned to the same assignee as this application. This circuit breaker is adjusted so that it opens only in response to very severe overloads and short circuits.

When it does open, it causes the generator 1 to be disconnected entirely from the load circuit by effecting the opening of the circuit breaker 3. The opening of the circuit breaker 3 effects the opening of all of the other circuit breakers. After the circuit breakers 3 and all of the other circuit breakers have opened the circuit breaker 50 closes, and then the circuit breaker 3 closes, suitable interlocks on the different circuit breakers being provided for accomplishing this result as will be hereinafter described.

The current supplied by the source 1 to moderate overloads is controlled by the circuit breaker 4, 51 and 52, which, when closed, respectively short circuit resistors 5, 53, and 54 in the circuit between the generator and the load circuit 2. When all of the circuit breakers are closed and the current supplied by the generator 1 exceeds a predetermined value, the overload relay 55 which is connected so as to be responsive to the current supplied by the generator operates and effects the opening of the circuit breaker 52, so that the resistor 54 is connected in series with the generator. If the load current exceeds a higher value, the overload relay 56 operates and effects the opening of the circuit breaker 51 so that the resistor 53 is connected in series with the generator. If the load current exceeds a still higher value, the overload relay 9 operates and effects the opening of the circuit breaker 4 so that the resistor 5 is connected in series with the generator. When the load current decreases, the overload relays 9, 56, and 55 operate in the reverse order to close the respective circuit breakers successively.

In a manner hereinafter described the circuit breakers 3, 4, 51, and 52 are interlocked so that the circuit breaker 3 has to be closed before the circuit breakers 4, 51, and 52 can close, and the circuit breakers 4, 51, and 52 are opened whenever the circuit breaker 3 opens.

It is the practice to design the resistors 5, 53, and 54 so that when all of these resistors are connected in series with the generator 1, the current supplied by the generator 1, under a predetermined overload condition, is limited to the safe commutating limit of the generator. Therefore, it is evident that if the circuit breaker 4 should be closed under said predetermined overload condition, the output of the generator would exceed the safe commutating limit of the generator so that it might be damaged.

Since the circuit breaker 4 is controlled by the overload relay 9, as in Fig. 1, it will be obvious that it is necessary to provide means for preventing the circuit breaker 4 from closing, when the circuit breaker 3 is closed to connect the generator 1 to the load circuit, until the load is less than a predetermined value. For accomplishing this result, in this modification of my invention, I have shown the relay 12 as being operative in response to a predetermined voltage across the load circuit 2 after the circuit breaker 3 closes to effect the closing of the circuit breaker 4. Instead of having the coil 13 of relay 12 connected across the load circuit by auxiliary contact on the circuit breaker 3, as shown in Fig. 1, the coil 13 is permanently connected across the load circuit 3 with a resistance 57 in series therewith and the circuit breaker 3 is provided with auxiliary contacts 58 which are closed when the circuit breaker is open, and which complete a short circuit around the coil 13 so that the relay is inoperative when the circuit breaker 3 is open.

The relay 12 is provided, as in Fig. 1, with contacts 14 and 15 which are in the circuits of the closing coil 6 of the circuit breaker 3 and the closing coil 8 of the circuit breaker 4 respectively so that the circuit breaker 3 can be closed only when the circuit breaker 4 is open, and circuit breaker 4 can be closed only when the circuit breaker 3 is closed.

As shown, the high speed circuit breaker 50 is connected between the negative terminal of the generator and ground, and controls a short circuit around a resistor 59. It is preferable to have the circuit breaker 50 connected in this manner as it affords protection in case of a flash-over between the positive terminal of the generator 1, but my invention is not limited to having the high speed circuit breaker connected at this point. Since the construction of this type of breaker is well known in the art and is fully described in the above mentioned co-pending application, and furthermore does not form a part of my invention, it is believed that a detailed description thereof is not necessary. The circuit breaker 50 is closed by energizing its reset coil 61 and its holding coil 60 and subsequently deenergizing its reset coil 61. The circuit breaker 50 opens when the circuit of the holding coil 60 is opened or the current through the bucking bar 63 exceeds a predetermined value. In order to cause a greater proportion of the total current to flow through the bucking bar under short circuit conditions than under normal overload conditions a reactance 64 is connected in shunt with the bucking bar 63.

The operation of the system shown in Fig. 3 is as follows:—When the switch 7 is open, all of the circuit breakers are open so that the resistor 59 is connected in series between the ground and the negative terminal of the generator 1, and the resistors 5, 53, and 54 are connected in series to the positive terminal of the generator 1. The connection between the generator and the ungrounded side of the distribution circuit 2, however, is open.

When the switch 7 is closed, circuits are completed for the holding coil 60 of the circuit breaker 50 and for the control relay 62 to effect the closing of the circuit breaker 50. The circuit of the holding coil 60 is from the positive terminal of the generator 1, through the switch 7, conductor 65, holding coil 60, bucking bar 63 and its inductive shunt 64, resistor 59 to the negative terminal of the generator. The circuit of the relay 62 is from the positive terminal of the generator 1 through the switch 7, conductor 65, auxiliary contacts 66 on the circuit breaker 4, conductor 67, auxiliary contacts 68 on the circuit breaker 51, conductor 69, auxiliary contacts 70 on the circuit breaker 52, conductor 71, auxiliary contacts 72 on the circuit breaker 3, conductor 73, auxiliary contacts 74 on the circuit breaker 50, conductor 75, coil of relay 62, the ground, bucking bar 63 and its inductive shunt 64, resistor 59 to the negative terminal of the generator. The closing of the contacts 76 of the relay 62 completes the circuit of the reset coil 61 of the circuit breaker 50. This circuit is from the positive terminal of the generator 1, through the switch 7, conductor 65, contacts 76 of relay 62, conductor 77, reset coil 61, the ground, bucking bar 63 and its inductive shunt 64, resistor 59 to the negative terminal of the generator 1. The energization of the reset coil places the circuit breaker in its reset position so that when the reset coil 61 is subsequently deenergized the holding coil 60 and the spring 78 effect the closing of the main contacts of the circuit breaker to short circuit the resistor 59. The movement of the circuit breaker 50 by the energization of the reset coil 61, opens the auxiliary contacts 74 and closes the auxiliary contacts 79. The opening of the auxiliary contacts 74 deenergizes the relay 62 which in turn deenergizes the reset coil 61 so that the circuit breaker 50 closes. The closing of the auxiliary contacts 79 effects the completion of the circuit of the closing coil 6 of the circuit breaker 3 to close the circuit breaker. This circuit is from the positive terminal of the generator 1 through the switch 7, conductor 65, auxiliary contacts 79 on the circuit breaker 50, conductor 80, closing coil 6 of the circuit breaker 3, conductor 81, contacts 14 of the relay 12, the ground, bucking bar 63 and its inductive shunt 64, main contacts 82 of the circuit breaker 50 to the negative terminal of the generator 1. Since the auxiliary contacts 58 of the circuit breaker 3 are closed when the circuit breaker is open the relay 12 is deenergized and therefore the above traced circuit of the closing coil 6 is completed. The closing of the circuit breaker 3 connects the positive terminal of the generator 1 to the positive side of the load circuit 2 with the resistors 5, 53, and 54 and the overload relays 9, 55, and 56 in series therewith. In order that the closing coil 6 may be maintained energized, independently of the relay 12, the auxiliary contacts 83 on the circuit breaker 3 complete a circuit between the conductor 81 and the ground so that a circuit is completed in shunt around the contacts 14 of the relay 12.

The opening of the auxiliary contacts 58 on the circuit breaker 3, when it closes, removes the short circuit from around the coil 13 of the relay 12 so that this coil is connected, in series with the resistor 57, across the load circuit 2 and, therefore, the relay operates in response to the voltage of the load circuit 2.

If there is a short circuit connected to the load circuit when the circuit breaker 3 closes, the voltage drop across the load circuit is not great enough to cause the relay 12 to operate and close its contacts 15. When, however, the load connected to the load circuit is less than a predetermined amount, depending upon the setting of the relay 12, the voltage across the load circuit is high enough to cause the relay 12 to close its contacts 15, and thereby complete the circuit of the closing coil 8 of the circuit breaker 4 so as to close the circuit breaker and short circuit the resistor 5. The circuit of the closing coil 8 is from the positive terminal of the generator 1, through the switch 7, conductor 65, auxiliary contacts 79 on the circuit breaker 50, conductor 80, auxiliary contacts 10 of the overload relay 9, conductor 84, coil 8 of the circuit breaker 4, conductor 85, contacts 15 of the relay 12, conductor 81, auxiliary contacts 83 on the circuit breaker 3, the ground, bucking bar 63 and its inductive shunt 64, main contacts 82 of the circuit breaker 50 to the negative terminal of the generator 1.

In order that the contacts 15 of the relay 12 may not have to carry continuously the relatively large current through the closing coil 8 of the circuit breaker 4, the circuit breaker 4 is provided with the auxiliary contacts 86 which are closed when the circuit breaker is closed, and which complete a shunt around the contacts 15 of the relay 12.

If the current supplied by the generator 1 when the circuit breaker 4 closes, does not exceed the pick-up value of the overload relay 56, the contacts 87 of this relay 56 remain closed so that the circuit of the closing coil 88 of the circuit breaker 51 is completed, as soon as the auxiliary contacts 91 on the circuit breaker 4 close. If, however, the current exceeds the pick-up value of the overload relay 56, this relay opens its contacts 87, and thereby prevents the closing of the circuit breaker 51. As soon as the current through the overload relay 56 decreases below the drop-out value of the relay, the relay closes its contacts 87 and completes the circuit for the closing coil 88 of the circuit breaker 51 to close the circuit breaker and thereby short circuit the resistor 53. The circuit of the closing coil 88 is from the positive terminal of the generator 1 through the switch 7, conductor 65, auxiliary contacts 79 on the circuit breaker 50, conductor 80, contacts 87 of the overload relay 56, conductor 89, closing coil 88 of the circuit breaker 51, conductor 90, auxiliary contacts 91 on the circuit breaker 4, conductor 81, auxiliary contacts 83 on the circuit breaker 3, the ground, to the negative terminal of the generator 1 through the circuit heretofore described.

If the current supplied by the generator when the circuit breaker 51 closes, does exceed the pick-up value of the overload relay 55, the closing of the auxiliary contacts 96 on the circuit breaker 51 completes the circuit of the closing coil 93 of the circuit breaker 52. If, however, the current exceeds the pick-up value of the overload relay 56, the relay opens its contacts 92 and thereby prevents the closing of the circuit breaker 52 after the circuit breaker 51 closes, until the current decreases below the drop-out value of the overload relay 55. When the current decreases below this value, the relay 55 closes its contacts 92 and completes the circuit of the closing coil 93 of the circuit breaker 52 to close the circuit breaker and short circuit the resistor 54. The circuit of the closing coil 93 is from the positive terminal of the generator 1, through the switch 7, conductor 65, auxiliary contacts 79 on the circuit breaker 50, conductor 80, contacts 92 of the overload relay 55, conductor 94, closing coil 93, conductor 95, auxiliary contacts 96 on the circuit breaker 51, to conductor 90 which is connected to the negative terminal of the generator 1 in a manner heretofore described. When the circuit breaker 53 closes the generator 1 is connected directly to the load circuit 2.

When the load connected to the load circuit 2 increases above a predetermined value after all of the circuit breakers have been closed, the overload relays 55, 56 and 9 operate at successively increasing values of current to effect the opening of the circuit breaker 52, 51 and 4 and the insertion of the respective resistor 54, 53 and 5 in series with the generator. When the abnormal load decreases the overload relays 55, 56, and 9 close their contacts in the reverse order from which they opened and effect the closing of the corresponding circuit breakers 52, 51, and 4.

It will be observed that with this arrangement the circuit breakers 4, 51, and 52 are opened and closed to limit the current supplied by the generator without effecting the opening of the circuit breaker 3 to disconnect the generator 1 from the load circuit 2 so long as the overload does not exceed a predetermined value. When, however, a short circuit or an overload occurs which is severe enough to cause the high speed circuit breaker 50 to open, the opening of the auxiliary contacts 79 on the circuit breaker 50 opens the circuits of the closing coils 6, 8, 88 and 93 so that the circuit breaker 3, 4, 51 and 52 also open. The resistor 59, which is inserted in series with the generator 1 when the circuit breaker 50 opens, limits the current which the circuit breaker 3 has to interrupt when it opens and entirely disconnects the generator from the distribution circuit. As soon as all of the circuit breakers have opened the circuits of the control relay 62 and the reset coil 61 are controlled in the manner heretofore described to effect the closing of the circuit breaker 50. As soon as the circuit breaker 50 is closed, the circuit breaker 3 is closed in the manner heretofore described to connect the generator to the load circuit 2 with the resistors 5, 53 and 54 in series therewith. As soon as the overload or short circuit has decreased to a sufficient value for the relay 12 to pick-up and closes its contacts 15, the circuit breakers 4, 51 and 52 are closed in the manner heretofore described.

It will be observed that by arranging the relay 12 in the manner described it is impossible for the circuit breaker 4 to close, after the circuit breaker 3 closes, until the load connected across the load circuit is less than a value which will cause the overload relay 9 to pick-up when the circuit breaker 4 closes. Therefore, there is no possibility of the circuit breaker 4 closing and connecting the generator 1 to an abnormal load which might damage the generator.

While I have shown and described several modifications of my invention, I do not desire to be limited thereto but seek to cover in the appended claims all those modifications that fall within the true spirit and scope of my invention.

What I claim as new and desire to secure by Letters Patent of the United States, is:

1. In an automatic switching equipment, a source of current, a load circuit, current limiting means, switching means adapted when closed to connect said source to said load circuit with said current limiting means in series therewith, a second switching means adapted to short circuit said current limiting means, a current responsive means for controlling the operation of said last mentioned switching means, said current responsive means being arranged to effect the operation of said second mentioned switching means to open the short circuit around said current limiting means in response to one value of current supplied by said source and to effect the operation of said second mentioned switching means to close the short circuit in response to a lower value of current, and means operative in response to the closing of said first mentioned switching means to prevent the closing of said second mentioned circuit breaker until the current through said current limiting means decreases below a predetermined value.

2. In an automatic switching equipment, a source of current, a load circuit, a load limiting resistor, a circuit breaker adapted when closed to connect said source to said load circuit with said resistor in series therewith, a second circuit breaker adapted when closed to short circuit said resistor, an overload relay for controlling the operation of said second circuit breaker, said overload relay having different pick-up and drop-out values whereby said second circuit breaker is opened in response to one current value and is closed in response to another current value, and means operative in response to the closing of said first circuit breaker for preventing the closing of said second circuit breaker until the current through said resistor decreases below the drop-out value of said overload relay.

3. In an automatic switching equipment, a source of current, a load circuit, a current limiting means, switching means adapted to connect said source to said load circuit with said current limiting means in series therewith, a second switching means arranged to short circuit said current limiting means, an overload relay for controlling the operation of said second switching means, said overload relay being arranged to effect the operation of said second switching means to remove the short circuit from around said current limiting means when the current supplied by said source exceeds a predetermined value and to effect the operation of said second switching means to short circuit said current limiting means when the current supplied by said source decreases below a predetermined lower value, and means responsive to the voltage across said load circuit for controlling the closing of said second circuit breaker.

4. In combination, a source of current, a load circuit, a resistor, means arranged to connect said source to said load circuit with said resistor in series therewith, an overload relay responsive to the current supplied to said load circuit by said source, electroresponsive means arranged to short circuit said resistor, a circuit for said electroresponsive device, contacts in said last mentioned circuit controlled by said overload relay, a voltage relay, means controlled by said first mentioned means for controlling the connection of said voltage relay across said load circuit, and contacts in the circuit of said electroresponsive device controlled by said voltage relay.

5. In combination, a source of current, a load circuit, a resistor, an electromagnetically operated switch arranged to connect said source to said circuit with said resistor in series therewith, a circuit for said switch, means operative to complete said circuit whereby said switch may be closed, an overload relay responsive to the current supplied to said load circuit by said source, a second electromagnetically operated switch arranged to short circuit said resistor, a circuit for said short-circuiting switch controlled by said overload relay, a relay arranged to be connected across said load circuit so as to be responsive to the voltage thereof when said first mentioned switch is closed, and contacts in the circuit of said short-circuiting switch controlled by said voltage relay.

6. In an automatic switching equipment, a load circuit, a source of current, means arranged to connect said source to said load circuit, switching means adapted to insert current limiting means in series with said source when said connecting means is closed and the current supplied by said source exceeds a predetermined value and to cut out said current limiting means when the current subsequently decreases below a predetermined value, means adapted to effect the operation of said connecting means to disconnect said source from said load circuit in response to a predetermined abnormal condition on said load circuit, said connecting means and said switching means being interlocked so that said connecting means can be closed to connect said source to said load circuit only with the current limiting means in series therewith, and means for preventing the operation of said switching means to cut out said current limiting means after said source is reconnected to said load circuit until the load connected to the load circuit is less than a predetermind value.

In witness whereof, I have hereunto set my hand this 7th day of April, 1924.

GORDON R. McDONALD.